US012697681B2

(12) United States Patent
Mori

(10) Patent No.: US 12,697,681 B2
(45) Date of Patent: Aug. 4, 2026

(54) LASER PROCESSING SYSTEM AND CONTROL METHOD

(71) Applicant: FANUC CORPORATION, Yamanashi (JP)

(72) Inventor: Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 723 days.

(21) Appl. No.: 18/246,500

(22) PCT Filed: Oct. 14, 2021

(86) PCT No.: PCT/JP2021/038028
§ 371 (c)(1),
(2) Date: Mar. 23, 2023

(87) PCT Pub. No.: WO2022/080446
PCT Pub. Date: Apr. 21, 2022

(65) Prior Publication Data
US 2023/0356326 A1     Nov. 9, 2023

(30) Foreign Application Priority Data

Oct. 16, 2020     (JP) ................................. 2020-174435

(51) Int. Cl.
*B23K 26/082*     (2014.01)
*B23K 26/044*     (2014.01)
*B23K 26/08*      (2014.01)

(52) U.S. Cl.
CPC .......... *B23K 26/082* (2015.10); *B23K 26/044* (2015.10); *B23K 26/0884* (2013.01)

(58) Field of Classification Search
CPC . B23K 26/082; B23K 26/044; B23K 26/0884
See application file for complete search history.

(56) References Cited

U.S. PATENT DOCUMENTS 5,465,037 A      11/1995   Huissoon et al.
11,810,799 B2 *  11/2023   Chung ............... B23K 26/1464
                           (Continued)

FOREIGN PATENT DOCUMENTS

CN       109719386 A    5/2019
CN       111375940 A    7/2020
                (Continued)

OTHER PUBLICATIONS

JP2013146773A—translate (Year: 2025).*
International Search Report issued in PCT/JP2021/038028; mailed Dec. 7, 2021.

*Primary Examiner* — Justin C Dodson
*Assistant Examiner* — Keith Brian Assante
(74) *Attorney, Agent, or Firm* — Studebaker Brackett PLLC

(57)     ABSTRACT

Provided is a laser processing system with which correction of a control point can be carried out easily. This laser processing system is provided with a scanner capable of scanning a workpiece with laser light, a moving device for moving the scanner relative to the workpiece, and a scanner control device for controlling the scanner, wherein the scanner control device has a trajectory control unit for controlling the scanner such that the workpiece is irradiated with a control point correction trajectory for correcting a preset control point when the movement device is in a stopped state, and the control point correction trajectory has a prescribed length for specifying deviation of the laser light in the optical axis direction, and a prescribed shape for specifying the position of the control point and a direction of a coordinate system defined by the control point.

7 Claims, 16 Drawing Sheets

(56)                    References Cited

U.S. PATENT DOCUMENTS

| 2008/0161964 | A1 * | 7/2008 | Irie | B23K 26/0884 |
| | | | | 700/258 |
| 2013/0043225 | A1 * | 2/2013 | Schurmann | B23K 26/044 |
| | | | | 219/121.64 |
| 2016/0288254 | A1 * | 10/2016 | Pettit | B23K 26/0626 |
| 2017/0326687 | A1 * | 11/2017 | Li | B23K 26/048 |
| 2018/0065250 | A1 * | 3/2018 | Murakami | B23K 26/707 |
| 2018/0074312 | A1 * | 3/2018 | Murakami | B23K 26/21 |
| 2018/0161920 | A1 * | 6/2018 | Nomura | B23K 26/359 |
| 2018/0299260 | A1 * | 10/2018 | Nakamura | B23K 26/032 |
| 2020/0130107 | A1 * | 4/2020 | Mochizuki | B23K 26/702 |
| 2020/0209522 | A1 * | 7/2020 | Yamakawa | B23K 26/0643 |
| 2022/0168848 | A1 * | 6/2022 | Yoshida | B23K 26/142 |
| 2022/0258279 | A1 * | 8/2022 | Guggenmos | B23K 26/082 |
| 2022/0331898 | A1 * | 10/2022 | Sato | B23K 26/0823 |
| 2023/0256537 | A1 * | 8/2023 | Sato | B25J 19/023 |
| | | | | 700/253 |

FOREIGN PATENT DOCUMENTS

| JP | H06-142967 | A | | 5/1994 | |
| JP | 2002-292483 | A | | 10/2002 | |
| JP | 2012-135781 | A | | 7/2012 | |
| JP | 2013-020394 | A | | 1/2013 | |
| JP | 2013146773 | A | * | 8/2013 | B23K 26/04 |
| JP | 2020-032423 | A | | 3/2020 | |
| KR | 10-2020-0045028 | A | | 5/2020 | |

* cited by examiner

FIG. 3

MANIPULATE POSITION AND
DIRECTION OF CONTROL POINT
CORRECTION TRAJECTORY

LASER PROCESSING SYSTEM AND CONTROL METHOD

TECHNICAL FIELD

The present invention relates to a laser processing system and a control method thereof.

BACKGROUND ART

Conventionally, a laser processing system has been proposed in which a workpiece is irradiated with a laser beam from a position away from the workpiece to perform welding. In the laser processing system, a scanner that emits a laser beam is provided at the tip of an arm of a robot. The axes of the robot of the laser processing system are driven in accordance with a program stored in advance in a control device similarly to other industrial robots. Therefore, teaching work for creating a program using an actual machine and a workpiece is performed at a work site (for example, see Patent Document 1).

Patent Document 1: Japanese Unexamined Patent Application, Publication No. 2012-135781

DISCLOSURE OF THE INVENTION

Problems to be Solved by the Invention

When laser processing is performed using such a laser processing system, a deviation between the path of a laser irradiation point in the program and the actual path of the laser irradiation point becomes an issue.

Since the path of the laser irradiation point can be considered to be represented by a sequence of points in a coordinate system with respect to the base of the robot in a workspace, these points are referred to as control points. The control point may be a point on the path of the laser irradiation point, or may be a point that is not on the path of the laser irradiation point but is necessary to define the path of the laser irradiation point, such as the center of an arc.

A robot program and a scanner program are generated according to the position of each control point and each point of the direction (coordinate system of the control points) set in the program generation device of the laser processing system. However, a CAD data and the actual workpiece do not coincide with each other, and there are positional errors in the operation path of the robot, jigs, and the like. Therefore, it is necessary to teach and correct such a deviation and errors.

In addition, when combining a robot with a scanner in a laser processing system, a tool-center point (TCP) may need to be corrected. The TCP is represented by a position vector from the robot tip point to the scanner reference point. By correctly setting the TCP, the laser irradiation position on the program coincides with the actual laser irradiation position regardless of the posture of the robot.

Conventionally, correction of the control point and setting of the TCP have been performed using a teaching jig indicating a specific point immediately below the scanner. Usually, the specific point is the origin of the workspace of the scanner, and is set to a point where the laser is focused.

To indicate the specific point, a teaching jig made of metal, resin, or the like is used, or a plurality of additional guide lasers are crossed and the intersection is visually recognized. In either method, since the coordinates of one point immediately below the scanner are acquired, it is necessary to operate the robot to match a desired position on the actual workpiece with the specific point, which is not efficient.

In addition, in the conventional method, it is necessary to attach a teaching jig to the robot and to install an additional guide laser on the scanner. Therefore, a laser processing system capable of easily correcting a control point without requiring a teaching jig, an additional guide laser, or the like has been awaited.

Means for Solving the Problems

A laser processing system according to the present disclosure incudes a scanner capable of scanning a workpiece with a laser beam, a moving device configured to move the scanner relative to the workpiece, and a scanner control device configured to control the scanner. The scanner control device includes a trajectory control unit configured to control the scanner to illuminate the workpiece with a control point correction trajectory for correcting a preset control point in a state in which the moving device is stopped. The control point correction trajectory has a predetermined length for identifying a deviation of the laser beam in an optical axis direction and a predetermined shape for identifying a position of the control point and a direction defined by the control point in a coordinate system.

A method for controlling a laser processing system according to the present disclosure includes moving a scanner capable of scanning a workpiece with a laser beam, relative to the workpiece, stopping a moving device configured to move the scanner relative to the workpiece, and controlling the scanner to illuminate the workpiece with a control point correction trajectory for correcting a preset control point in a state in which the moving device is stopped. The control point correction trajectory has a predetermined length for identifying a deviation of the laser beam in an optical axis direction and a predetermined shape for identifying a position of the control point and a direction defined by the control point in a coordinate system.

Effects of the Invention

According to the present invention, it is possible to easily correct a control point.

BRIEF DESCRIPTION OF THE DRAWINGS

FIG. 3 is a block diagram showing the functional configuration of the laser processing system according to the present embodiment;

PREFERRED MODE FOR CARRYING OUT THE INVENTION

Figure 1:
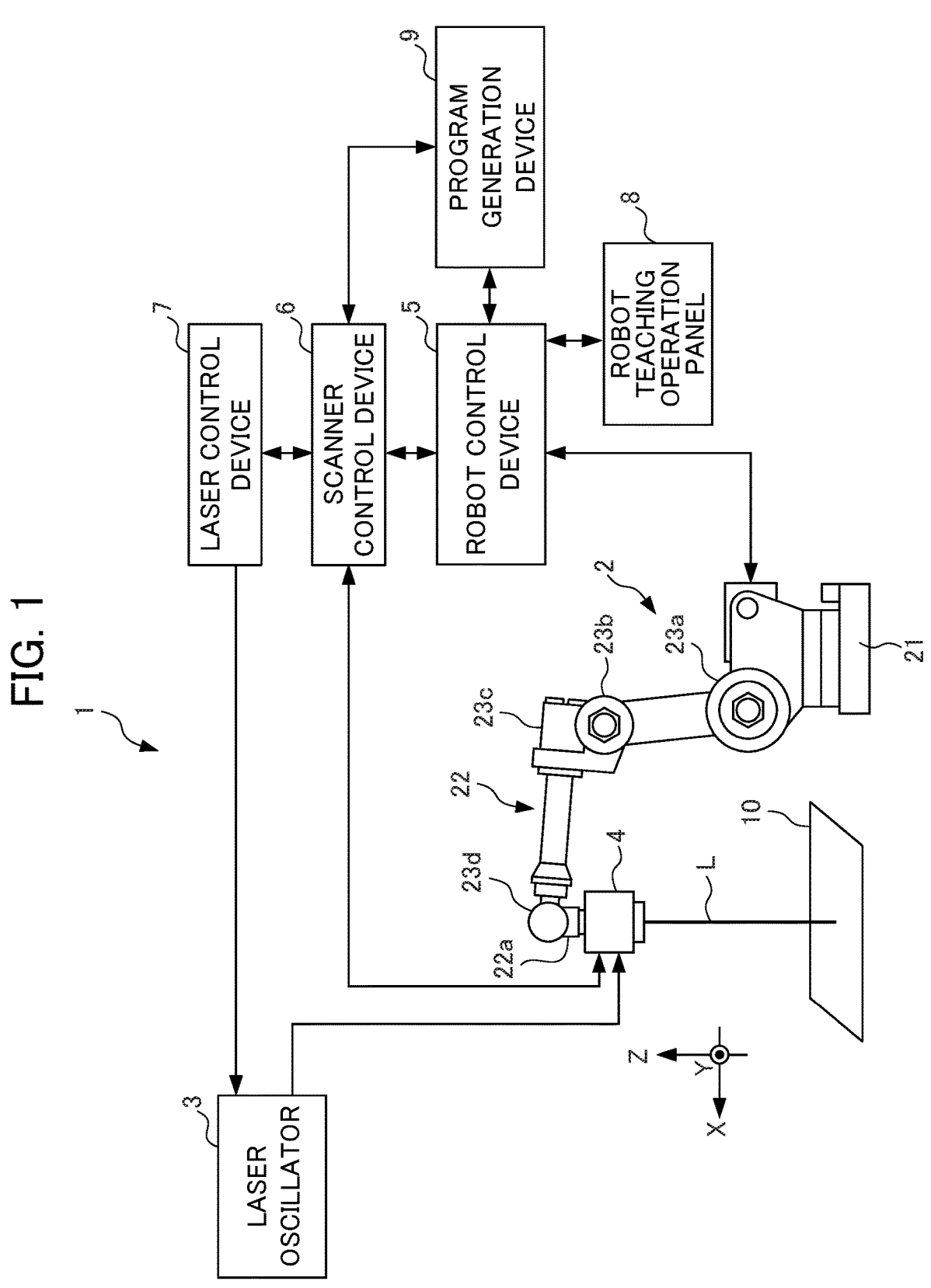
FIG. 1 shows the overall configuration of a laser processing system according to the present embodiment.

Embodiments of the present invention will now be described with reference to the drawings. FIG. 1 shows the overall configuration of a laser processing system 1 according to the present embodiment. The laser processing system 1 shown in FIG. 1 shows an example of a remote laser welding robot system.

The laser processing system 1 includes a robot 2, a laser oscillator 3, a scanner 4, a robot control device 5, a scanner control device 6, a laser control device 7, a robot teaching operation panel 8, and a program generation device 9.

The robot 2 is, for example, an articulated robot having a plurality of joints. The robot 2 includes a base 21, an arm 22, and a plurality of joint axes 23a to 23d each having a rotation axis extending in a Y direction.

Further, the robot 2 includes a plurality of robot servo motors, such as a robot servo motor that causes the arm 22 to rotationally move with a Z direction as a rotation axis, and a robot servo motor that causes the arm 22 to move in an X direction by rotating the joint axes 23a to 23d. Each of the robot servo motors rotationally drives based on drive data from the robot control device 5 described later.

The scanner 4 is fixed to a leading end portion 22a of the arm 22 of the robot 2. Accordingly, the robot 2 can move the scanner 4 to any position and any orientation in a workspace at a predetermined robot speed by the rotational drive of each robot servo motor. That is, the robot 2 is a moving device that moves the scanner 4 relative to a workpiece 10. In the present embodiment, the laser processing system 1 uses the robot 2 as a moving device, but the present invention is not limited thereto. For example, a three-dimensional machining device may be used as a moving device.

The laser oscillator 3 includes a laser medium, an optical resonator, and an excitation source. The laser oscillator 3 generates a laser beam with laser output based on a laser output command from the laser control device 7 described later, and supplies the generated laser beam to the scanner 4. Examples of the type of laser to be oscillated include a fiber laser, a $CO_2$ laser, and a YAG laser. The type of laser is not limited in the present embodiment.

The laser oscillator 3 can output a processing laser for processing the workpiece 10 and a guide laser for adjusting the processing laser. The guide laser is a visible laser adjusted on the same axis as the processing laser.

The scanner 4 receives a laser beam L emitted from the laser oscillator 3 and can scan the workpiece 10 with the laser beam L.

Figure 2:
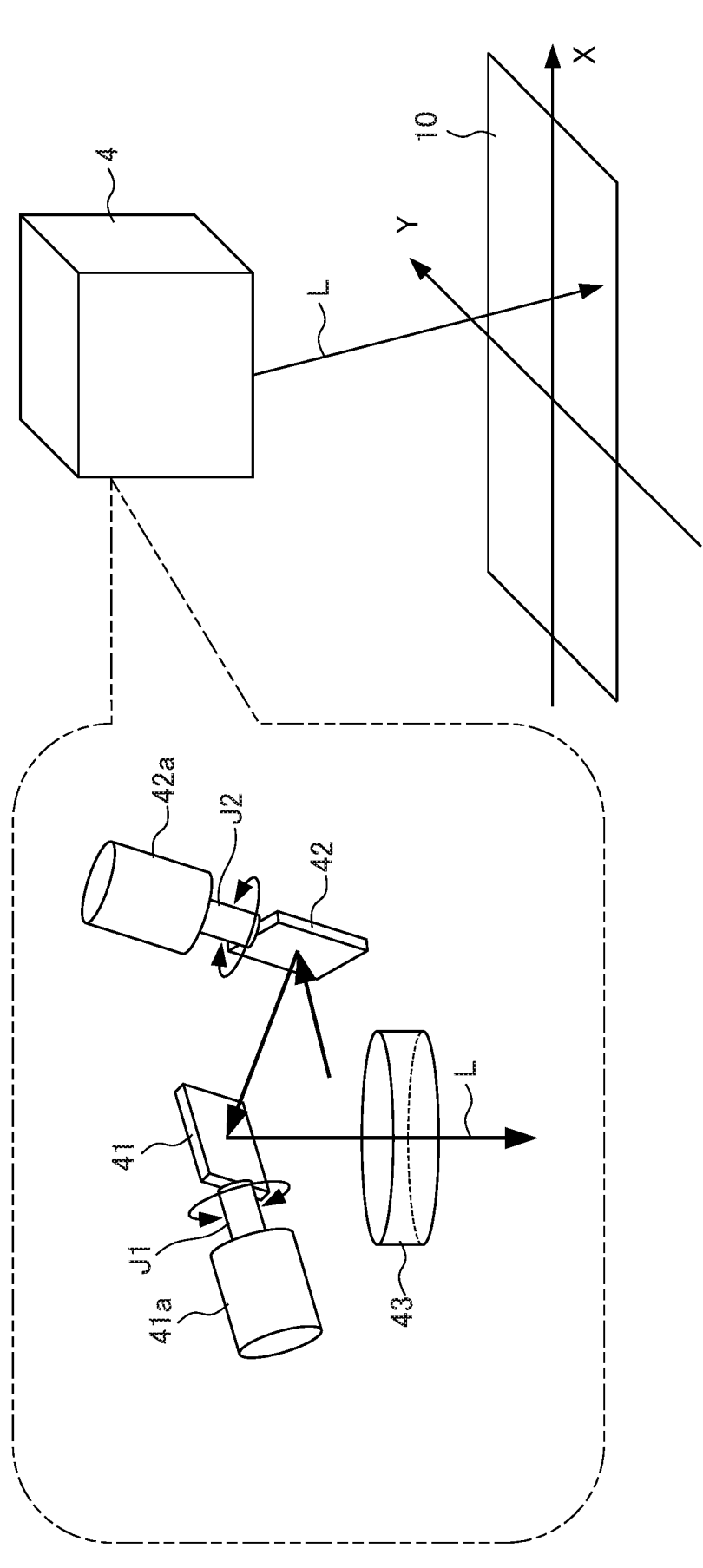
FIG. 2 is a diagram for illustrating the optical system of a scanner in the laser processing system according to the present embodiment.

FIG. 2 is a diagram for illustrating the optical system of the scanner 4 in the laser processing system 1 according to the present embodiment. As shown in FIG. 2, the scanner 4 includes, for example, two galvano mirrors 41 and 42 that reflect the laser beam L emitted from the laser oscillator 3, galvano motors 41a and 42a that rotationally drive the galvano mirrors 41 and 42, respectively, and a cover glass 43.

The galvano mirrors 41 and 42 are configured to be respectively rotatable around two rotation axes J1 and J2 orthogonal to each other. The galvano motors 41a and 42a rotationally drive based on the drive data from the laser control device 7 to independently rotate the galvano mirrors 41 and 42 around the rotation axes J1 and J2.

The laser beam L emitted from the laser oscillator 3 is sequentially reflected by the two galvano mirrors 41 and 42, then is emitted from the scanner 4, and reaches a processing point (welding point) of the workpiece 10. At this time, when the two galvano mirrors 41 and 42 are respectively rotated by the galvano motors 41a and 42a, the incident angles of the laser beam L incident on the galvano mirrors 41 and 42 continuously change. As a result, the workpiece 10 is scanned with the laser beam L from the scanner 4 along a predetermined path, and a welding trajectory is formed on the workpiece 10 along the scanning path of the laser beam L.

The scanning path of the laser beam L emitted from the scanner 4 onto the workpiece 10 can be optionally changed in the X and Y directions by controlling the rotational drive of the galvano motors 41a and 42a as appropriate to change the rotation angles of the galvano mirrors 41 and 42.

The scanner 4 also includes a zooming optical system (not shown) capable of changing the positional relationship with a Z-axis motor. The scanner 4 can optionally change the laser irradiation point in the Z direction by moving, in an optical axis direction, the point where the laser is focused, by the drive control of the Z-axis motor.

The cover glass 43 is disk-shaped, and has a function of transmitting the laser beam L sequentially reflected by the galvano mirrors 41 and 42 toward the workpiece 10 and protecting the inside of the scanner 4.

The scanner 4 may be a trepanning head. In this case, the scanner 4 can have, for example, a configuration in which a lens having one inclined surface is rotated by a motor to refract the incident laser and irradiate to any location.

The robot control device 5 outputs drive control data to each robot servomotor of the robot 2 in accordance with a predetermined robot program to control the operation of the robot 2.

The scanner control device 6 adjusts the positions of the lens and mirrors in the mechanism of the scanner 4. The scanner control device 6 may be incorporated in the robot control device 5.

The laser control device 7 controls the laser oscillator 3, and controls it to output a laser beam in response to a command from the scanner control device 6. Not only may the laser control device 7 be connected to the scanner control device 6, but the laser control device 7 may also be directly connected to the robot control device 5. Alternatively, the laser control device 7 may be integrated with the scanner control device 6.

The robot teaching operation panel 8 is connected to the robot control device 5, and is used by an operator to operate the robot 2. For example, the operator inputs machining information for performing laser processing through a user interface on the robot teaching operation panel 8.

The program generation device 9 is connected to the robot control device 5 and the scanner control device 6, and generates programs for the robot 2 and the scanner 4. The program generation device 9 will be described in detail with reference to FIG. 3. In the present embodiment, it is assumed that at least the scanner 4, and preferably also the robot 2, are adjusted so as to operate accurately in response to commands of the programs.

Figure 3:
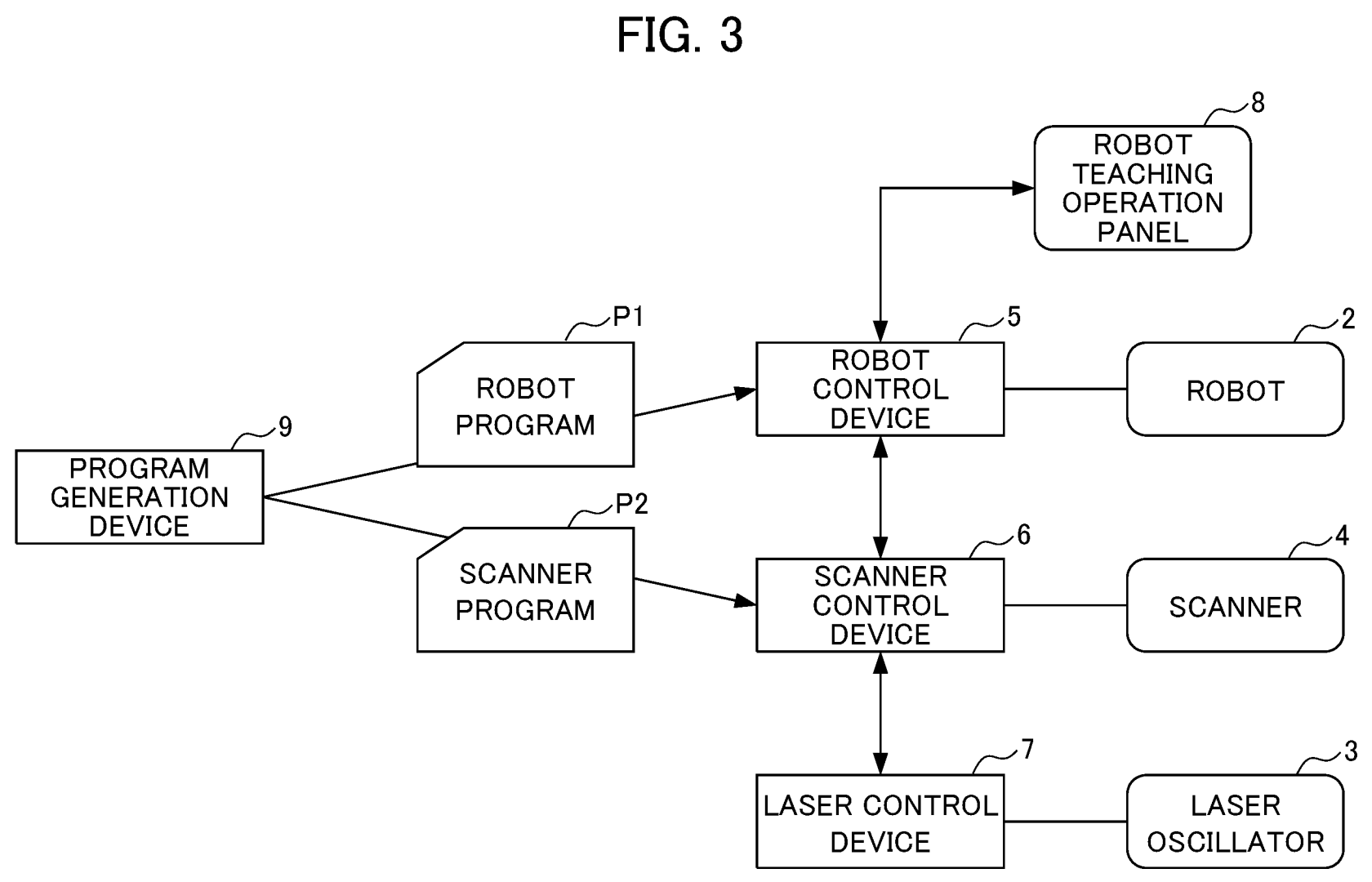

FIG. 3 is a block diagram showing the functional configuration of the laser processing system 1 according to the present embodiment. As described above, the laser processing system 1 includes the robot 2, the laser oscillator 3, the scanner 4, the robot control device 5, the scanner control device 6, the laser control device 7, the robot teaching operation panel 8, and the program generation device 9. Hereinafter, with reference to FIG. 3, the operations of the robot control device, the scanner control device 6, the laser control device 7, and the program generation device 9 will be described in detail.

The program generation device 9 generates a robot program P1 for the robot 2 and a scanner program P2 for the scanner 4 in a virtual workspace from CAD/CAM data. Further, the program generation device 9 generates a program for emitting a control point correction trajectory.

The generated robot program P1 and scanner program P2 are respectively transferred to the robot control device 5 and scanner control device 6. When the robot program P1 stored in the robot control device 5 is started by operating the robot teaching operation panel 8, a command is sent from the robot control device 5 to the scanner control device 6, and the scanner program P2 is also started.

The robot control device 5 outputs a signal when the robot 2 conveys the scanner 4 to a predetermined position. In response to the signal output from the robot control device 5, the scanner control device 6 drives the optical system in the scanner 4.

The scanner control device 6 commands the laser control device 7 to output a laser. The robot control device 5, the scanner control device 6, and the laser control device 7 synchronize the movement of the robot 2, the scanning of the laser beam axis, and the output of the laser beam by exchanging signals at appropriate timings.

The robot 2 and the scanner 4 share position information and time information, and control the laser irradiation point at a desired position in the workspace. Further, the robot 2 and the scanner 4 start and end laser irradiation at appropriate timings. Thus, the laser processing system 1 can perform laser processing such as welding.

The program generation device 9 incorporates 3D modeling software. The operator can operate the models of the robot 2 and the scanner 4 on the computer to check the laser irradiation point, coordinate values, and so on.

Further, the program generation device 9 generates a 3D model of the workpiece 10 using the CAD data of the workpiece 10, and sets one or more control points on the 3D model of the workpiece 10. Then, the program generation device 9 defines a welding shape with respect to the set control points.

As described above, since the path of the laser irradiation point can be considered to be represented by a sequence of points in the coordinate system with respect to the base of the robot in the workspace, these points can be referred to as control points. The control points may be on the path of the laser irradiation point, or may be points necessary to define the path of the laser irradiation point, not on the path of the laser irradiation point, such as the center of an arc.

Once the control points and the welding shape are defined, the program generation device 9 calculates the robot path along which the robot 2 moves and the scanning path of the laser irradiation point by the scanner 4.

With respect to the laser irradiation point in the three-dimensional space, the posture of the robot 2 and the rotation angles of the galvano motors 41a and 42a at the laser irradiation point by the scanner 4 are not uniquely determined. Therefore, the program generation device 9 includes an algorithm for searching for an optimal solution that satisfies conditions. The conditions in generating the robot program P1 and the scanner program P2 include shortening machining time, limiting the laser irradiation angle with respect to the workpiece 10, and limiting the posture range of the robot 2.

When the control point is corrected, the scanner control device 6 transmits the position information of the corrected control point and the direction information in a coordinate system of the corrected control point to the program generation device 9.

The program generation device 9 regenerates the robot program P1 and the scanner program P2 based on the position information of the corrected control point and the direction information in the coordinate system of the corrected control point using the above-described algorithm for searching for the optimal solution. The generated robot program P1 and scanner program P2 are transmitted to the scanner control device 6 again.

In this way, by generating the robot program P1 and the scanner program P2 reflecting the corrected control point, the program generation device 9 can correct the robot path in the robot program P1 and the irradiation path of the laser beam by the scanner 4 in the scanner program P2.

Figure 4A:
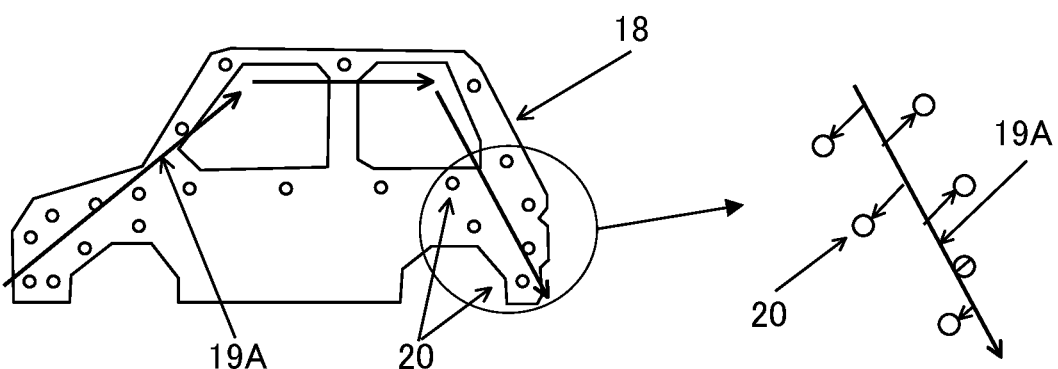
FIG. 4A shows the path of a robot before correcting control points.
Figure 4B:
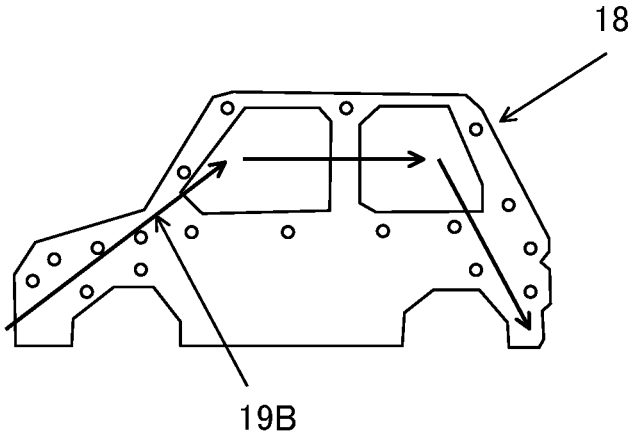
FIG. 4B shows the path of the robot after correcting the control points.

FIGS. 4A and 4B shows an example of correcting the path of the robot 2 in the robot program P1. FIG. 4A shows the path of the robot 2 before correcting control points, and FIG. 4B shows the path of the robot 2 after correcting the control points.

When the vicinity of welding points 20 on the workpiece 18 shown in FIG. 4A is enlarged, the welding points 20 with the laser emitted from the scanner 4 are determined according to a robot path 19A in the robot program P1 and the emission path of the laser beam by the scanner 4 in the scanner program P2.

Therefore, as shown in FIG. 4B, when a change in the positions of the welding points 20 and an increase or decrease in the control points occur, the program generation device 9 regenerates the robot program and the scanner program based on the change in the positions of the welding points 20 and the increase or decrease in the control points, and thus can regenerate an optimal robot path 19B and laser emission path.

Figure 5:
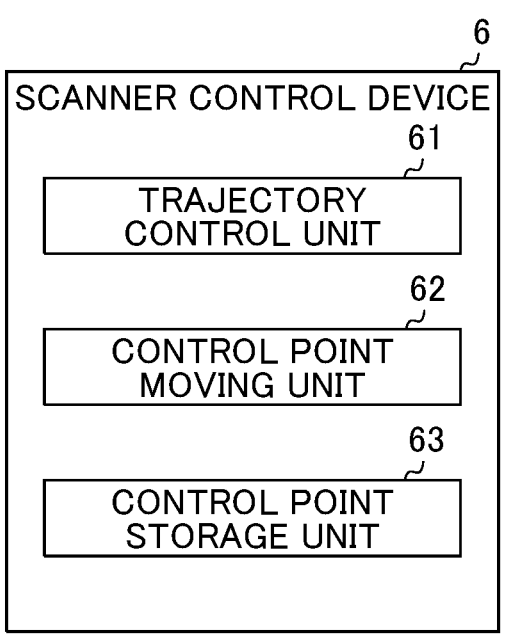
FIG. 5 is a block diagram showing the functional configuration of a scanner control device according to the present embodiment.

FIG. 5 is a block diagram showing the functional configuration of the scanner control device 6 according to the present embodiment. As shown in FIG. 5, the scanner control device 6 includes a trajectory control unit 61, a control point moving unit 62, and a control point storage unit 63.

The trajectory control unit 61 controls the scanner 4 based on the program for emitting a control point correction trajectory so as to illuminate the workpiece 10 with the control point correction trajectory for correcting a preset control point in a state in which the robot 2 is stopped. The control point moving unit 62 moves the control point based on the control point correction trajectory, in accordance with the operation of the robot teaching operation panel 8.

The control point storage unit 63 stores the position of the control point moved by the control point moving unit 62 and the direction defined by the moved control point in the coordinate system. Based on the position of the control point and the direction defined by the control point in the coordinate system stored in the control point storage unit 63, the trajectory control unit 61 controls the scanner 4 to illuminate the workpiece 10 with the control point correction trajectory.

Figure 6A:
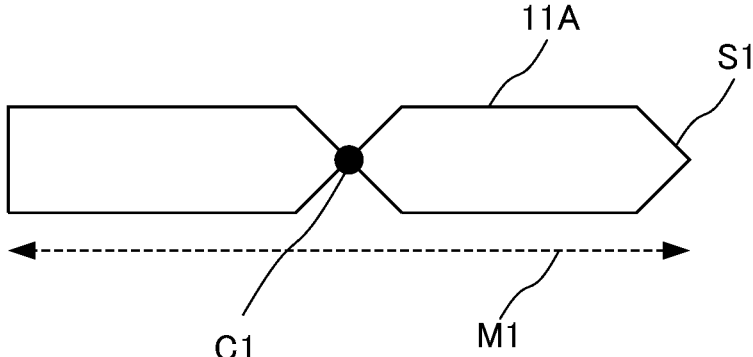
FIG. 6A shows an example of a control point correction trajectory.

FIG. 6A shows an example of a control point correction trajectory. As shown in FIG. 6A, a control point correction trajectory 11A has a predetermined length M1 for identifying a deviation of the laser beam in the optical axis direction, and a predetermined shape S1 for identifying the position of a control point C1 and the direction defined by the control point in the coordinate system. Here, the predetermined length M1 is preferably, for example, about 100 mm. The predetermined shape S1 is preferably a shape that can be distinguished between the positive direction and the opposite direction.

The trajectory control unit 61 controls the scanner 4 so that the control point correction trajectory 11A is applied with a guide laser instead of a machining laser. Thus, the laser processing system 1 can illuminate the workpiece 10 with the control point correction trajectory 11A without machining the workpiece 10.

Figure 6B:
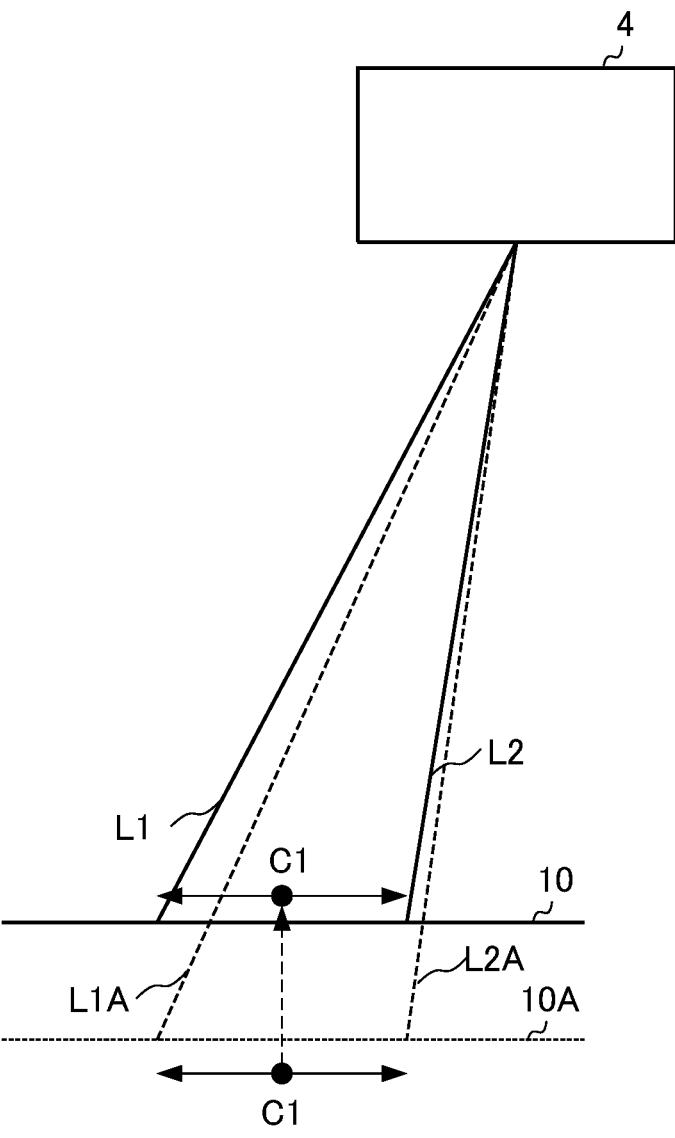
FIG. 6B shows an operation of correcting a control point using the control point correction trajectory shown in FIG. 6A.

FIG. 6B shows an operation of correcting the control point using the control point correction trajectory 11A shown in FIG. 6A. FIG. 6B is a side view of the workpiece 10 for convenience of explanation. Here, L1A and L2A indicate both ends of the control point correction trajectory 11A in FIG. 6A, and the guide laser travels between L1A and L2A. In FIG. 6B, the scanner control device 6 corrects the control point C1 for a virtual workpiece 10A in the scanner program to be on the actual workpiece 10. Thus, guide lasers L1A and L2A are corrected to guide lasers L1 and L2.

In FIG. 6B, when the control point C1 is deviated in the optical axis direction and the predetermined length M1 is small, the deviation of the control point C1 is small, and thus it is difficult for the operator to visually determine the deviation. When the predetermined length M1 is large, the deviation in the optical axis direction is relatively large, so that the operator can easily visually determine the deviation.

The larger the predetermined length M1, the easier it is to determine, but the preferable size of the predetermined length M1 differs depending on the accuracy required for correcting the deviation in the optical axis direction, the distance between the scanner 4 and the workpiece 10, the size of the portion to be laser processed, and the like. For example, when the distance between the workpiece 10 and the scanner 4 is 500 mm, the predetermined length M1 is preferably about 100 mm.

The control point correction trajectory 11A on the virtual workpiece 10A in the scanner program is deviated in position on the actual workpiece 10 and is smaller than the command of the scanner program. This indicates that the position of the control point correction trajectory 11A in the optical axis direction and the position of the control point correction trajectory 11A in the direction perpendicular to the optical axis are deviated.

Therefore, by operating the guide lasers L1A and L2A emitted from the scanner 4, the position and the length of the control point correction trajectory 11A are matched on the actual workpiece 10. Thereby, the scanner control device 6 can appropriately illuminate the actual workpiece 10 between the guide lasers L1 and L2.

In FIG. 6B, the range between the guide lasers L1A and L2A, and the range between the guide lasers L1 and L2 indicate ranges in which the guide laser beam is scanned. When the scanner control device 6 changes the position of the control point C1, the control point correction trajectory for repeatedly scanning is formed on the surface of the workpiece 10. Then, the scanning range of the guide laser beam is shifted from the range between the guide lasers L1A and L2A to the range between the guide lasers L1 and L2. Thereby, the predetermined length M1 of the control point correction trajectory 11A on the surface of the workpiece 10 becomes a desired size, and the teaching correction is completed.

Here, as described above, the control point correction trajectory requires a predetermined length for identifying a deviation of the laser beam in the optical axis direction. As described below, the predetermined length for identifying a deviation of the laser beam in the optical axis direction is calculated from the distance at which a change in the length of the control point correction trajectory can be visually recognized, the amount of the deviation of the laser beam in the optical axis direction to be identified, and the distance between the scanner 4 and the laser irradiation point of the laser beam.

Figure 6C:
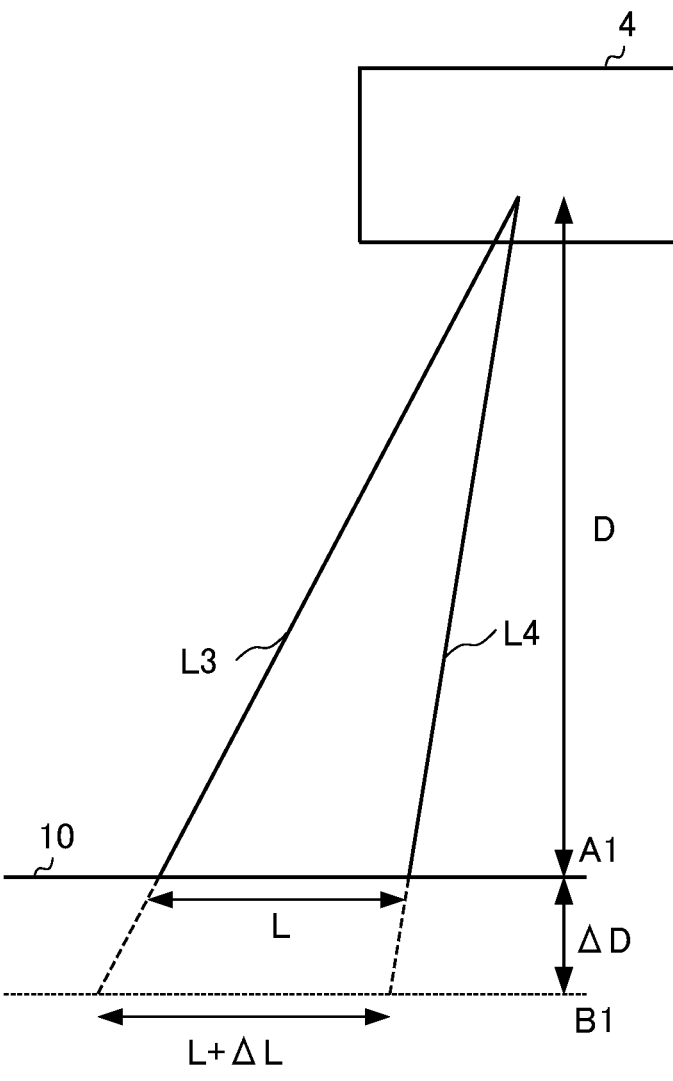
FIG. 6C is a diagram for illustrating a deviation of a laser beam in an optical axis direction.

FIG. 6C is a diagram for illustrating a deviation of the laser beam in the optical axis direction. As shown in FIG. 6C, the scanner 4 and the workpiece 10 are opposed to each other, and a comparison is made between a case in which the workpiece 10 is at a position A1 and a case in which the workpiece 10 is at a position B1.

At this time, the deviation of the laser beam in the optical axis direction between the position A1 and the position B1 of the workpiece 10 is $\Delta D$. As shown in FIG. 6C, the length of the control point correction trajectory at the position A1 is L, and the length of the control point correction trajectory at the position B1 is $L+\Delta L$. The distances from the galvano mirrors 41 and 42 in the scanner 4 are D and $D+\Delta D$ at the position A1 and the position B1 of the workpiece 10, respectively. The relationship between the lengths L and $L+\Delta L$ and the distances D and $D+\Delta D$ is as follows. $L=(\Delta L/\Delta D)\times D$ In practice, the galvano mirrors 41 and 42 each have two axes of X and Y axes, and the workpiece 10 and scanner 4 are not necessarily opposed to each other. The difference in distance in the optical axis direction between the center of the scanning range of the scanner 4 and its peripheral portion has an impact. Even in consideration of these factors, the relationship between the lengths L and $L+\Delta L$ and the distances D and $D+\Delta D$ can be approximated by the above equation.

When the operator visually recognizes the control point correction trajectory, for example, the length $\Delta L$ can be regarded as the minimum length in which the difference can be determined. At this time, if the distance $\Delta D$ is defined as a deviation of the laser beam in the optical axis direction allowed in the laser processing, that is, the allowable range of the focal length, the length L (that is, the predetermined length described above) can be derived from the distance D between the scanner 4 and the workpiece 10.

For example, when $\Delta L$ is 1 mm, that is, when a difference of 1 mm can be visually recognized, $\Delta D$ is 5 mm, that is, when the allowable range of the focal length is 5 mm and D is 500 mm, that is, when the distance between the galvano mirrors 41 and 42 in the scanner 4 and the laser irradiation point is 500 mm, the length L (predetermined length) of the control point correction trajectory is 100 mm.

Further, when the correction pattern described later is used, the visible difference ΔL in the length is smaller. If a difference in the length of 0.1 mm can be discerned, the length L of the control point correction trajectory may be 10 mm. When the length L of the control point correction trajectory is kept at 100 mm, the position in the optical axis direction can be adjusted with ΔD=0.5 mm, i.e., an accuracy of 0.5 mm.

The operation of the operator to correct the control point will be described. In the correction of the control point in the present embodiment, the operator conveys the robot 2 to the vicinity of the control point by manual operations or semi-automatic operations, and stops the robot 2. When the guide laser is emitted by the scanner 4, the operator moves the scanner 4 while visually recognizing the shape of the control point correction trajectory illuminated on the workpiece 10. Thus, the operator can correct the position of the control point and the direction defined by the control point in the coordinate system.

Here, the manual operations mean that the operator operates the robot teaching operation panel 8, changes the posture of the robot 2, and conveys the scanner 4 to a desired position. The semi-automatic operations mean that, with respect to a desired control point in the 3D model, the scanner 4 is conveyed to a desired position by changing the posture of the robot 2 using a robot program for conveying the scanner 4 to the vicinity of the control point and a scanner program for emitting a guide laser, which are generated by the program generation device 9.

Specific operations of the manual operations are as follows.

(1) The robot 2 is driven to move the scanner 4 fixed to the leading end portion 22a of the arm 22 of the robot 2 to the vicinity of a control point to be corrected.

(2) The workpiece 10 is irradiated with a guide laser in a state in which the robot 2 is stopped. At this time, the scanner control device 6 uses the galvano mirrors 41 and 42 to repeatedly scan a control point correction trajectory at high speed with the guide laser.

(3) The operator can instruct moving in the X, Y, and Z axes and rotation around each axis of the guide laser with the robot teaching operation panel 8. The operator's instruction is transmitted from the robot control device 5 to the scanner control device 6, whereby the control point correction trajectory that is repeatedly scanned at high speed can be moved and rotated in space.

(4) The operator operates the control point correction trajectory by using the robot teaching operation panel 8 so that the control point correction trajectory is at a desired position and has a desired size while visually recognizing the control point correction trajectory projected onto the workpiece 10.

(5) When the position of the control point of the control point correction trajectory and the direction of the control point in the coordinate system are determined, the operator stores data on the control point correction trajectory in a storage device (not shown) of the laser processing system 1, and completes the teaching correction. When the operator operates the control point correction trajectory with the robot teaching operation panel 8, the robot 2 is stopped, and the position of the scanner 4 and the direction of the scanner 4 in the coordinate system do not change.

After stopping the scanner 4 in the vicinity of the control point to be corrected, the operator operates the robot teaching panel 8 to start a program for emitting the control point correction trajectory. In the case of the manual operations, since it is difficult to emit the guide laser to the vicinity of the control point to be corrected from the beginning, the scanner 4 emits the guide laser immediately below the scanner 4 immediately after starting the program for emitting the control point correction trajectory.

In contrast, the semi-automatic operations use the robot program and the scanner program generated by the program generation device 9. The operator starts the robot program, and stops the robot 2 when the scanner 4 reaches the vicinity of the control point to be corrected. Subsequent operations are the same as (2) to (5) in the manual operations. In the semi-automatic operations, the operator then moves the robot 2 from the stopping location to the vicinity of the next control point to be corrected by operating the robot 2 according to the robot program, and continues the correction work.

Several kinds of programs for emitting a control point correction trajectory may be prepared and used depending on the purpose. For example, a small control point correction trajectory may be used for a part of the workpiece 10 in which the area is small, and a large control point correction trajectory may be used for a part of the workpiece 10 in which the area is large. A long control point correction trajectory may be used for a part along the straight line of a butt portion, and for a part like the lid of a cylinder, if the center point is a control point, the control point correction trajectory corresponding to that control point may be used. Further, a three-dimensional control point correction trajectory can be used on a cylindrical surface.

Figure 6D:
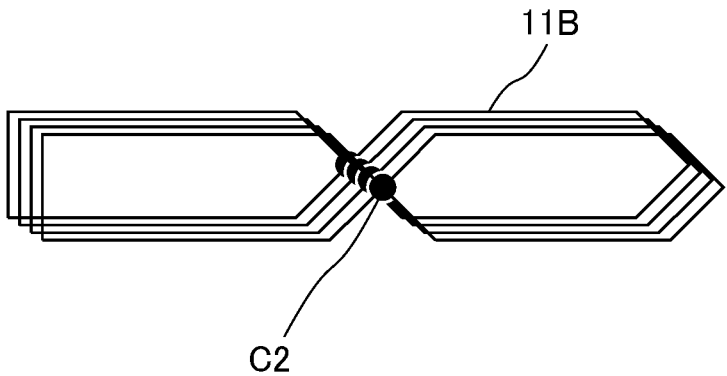
FIG. 6D shows another example of a control point correction trajectory.

FIG. 6D shows another example of a control point correction trajectory. As shown in FIG. 6D, a control point correction trajectory 11B is repeatedly scanned at a predetermined cycle by the scanner control device 6. The predetermined cycle preferably corresponds to, for example, a time per cycle of about 50 msec. Thus, the afterimage effect allows the operator to perceive the control point correction trajectory as if it were continuously drawn.

Figure 6E:
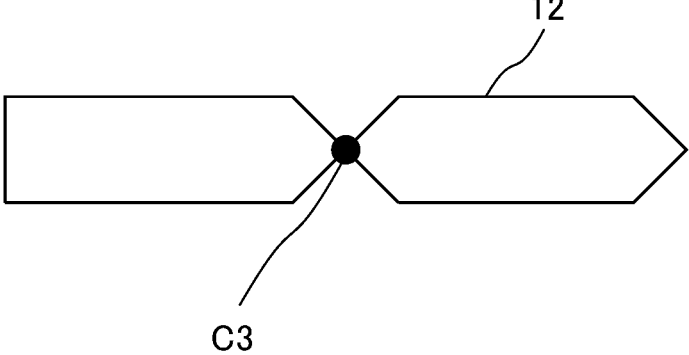
FIG. 6E shows an example of a correction pattern for correcting the control point correction trajectory.

FIG. 6E shows an example of a correction pattern 12 for correcting the control point correction trajectory. As shown in FIG. 6E, the correction pattern 12 has the same length and shape as the control point correction trajectory and can be disposed on the workpiece 10. The correction pattern 12 may be, for example, a sticker that can be attached to the workpiece 10, or a card-shaped article, a paper pattern, or a magnet, which can be disposed on the workpiece 10. Alternatively, the correction pattern 12 may be printed on the workpiece 10 in advance.

By using such a correction pattern 12, the control point correction trajectory illuminated on the workpiece 10 can be compared with the correction pattern 12 having the same length and shape as the control point correction trajectory in the scanner program for controlling the scanner 4.

Thus, the operator can check and correct the position, direction, size, and distortion of the control point correction trajectory by comparing the control point correction trajectory illuminated on the workpiece 10 with the control point correction trajectory in the scanner program.

Figure 6F:
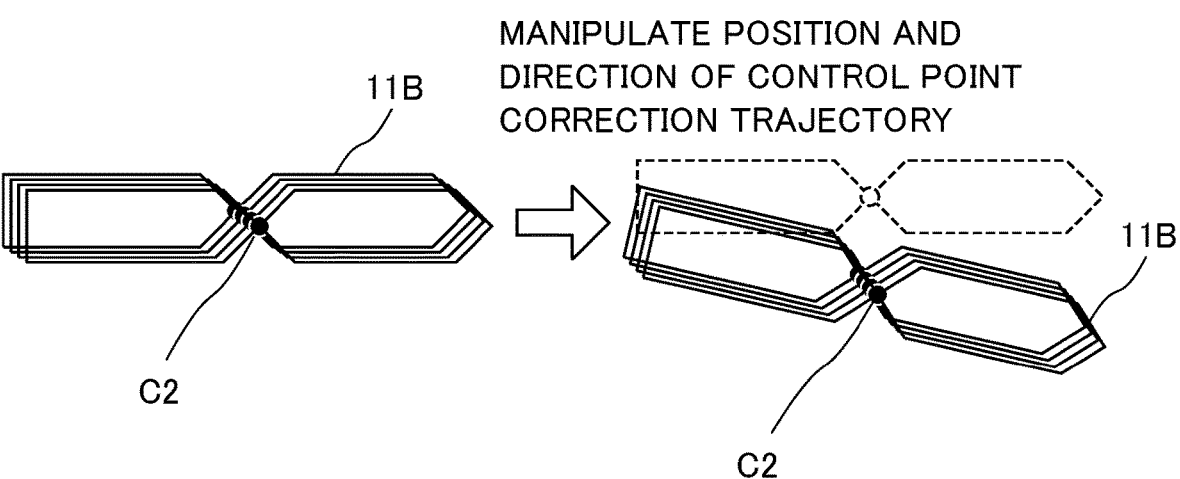
FIG. 6F shows an operation of correcting control points using the control point correction trajectory.

FIG. 6F shows an operation of correcting control points C2 using the control point correction trajectory 11B. As shown in FIG. 6F, the control point moving unit 62 moves the control points C2, and the trajectory control unit 61 moves the control point correction trajectory 11B based on the positions of the moved control points and the directions defined by the moved control points in the coordinate system.

The control point moving unit 62 can move the control points C2 in an orthogonal coordinate system such as the X, Y, and Z axes and a rotational coordinate system such as the w, p, and r axes (yaw, pitch, and roll). That is, the control point moving unit 62 can move the control points C2 with six degrees of freedom.

The program for emitting a control point correction trajectory controls the scanner 4 to emit a guide laser with an emitting starting point as a starting point, returns to the starting point again, and repeat these operations at high speed. The position of the laser irradiation point at the time of activation and the direction defined by the control points in the coordinate system are stored in the robot control device 5 or the scanner control device 6 as a position and a vector of the direction in the coordinates with the base axis of the robot 2 as the origin.

When the operator operates the robot teaching operation panel 8 to move the control point correction trajectory, the program for emitting the control point correction trajectory changes the irradiation point, for example, by 0.1 mm in the positive direction of the X-axis each time it returns to the emitting starting point. At the same time, the scanner control device 6 stores the change of the emitting starting point as the starting point of the changed emitting starting point.

After moving the control point correction trajectory to a desired position, that is, after moving the control points at desired positions and in a desired direction in the coordinate system, the operator notifies the scanner control device 6 that the movement of the control points have been completed using the robot teaching operation panel 8.

The scanner control device 6 transfers the information of the changed control points to the program generation device 9. Further, the program generation device 9 may transfer the information of the changed control points to a CAD system (not shown) as CAD data. The positions of the control points and the direction defined by the control points in the coordinate system can take various data formats such as the values of the coordinate system with the base axis of the robot 2 as the origin, or the amount of movement of the corrected control points. Further, in the manual operations, the scanner control device 6 can register any new position and direction in the coordinate system as a control point.

Figure 7A:
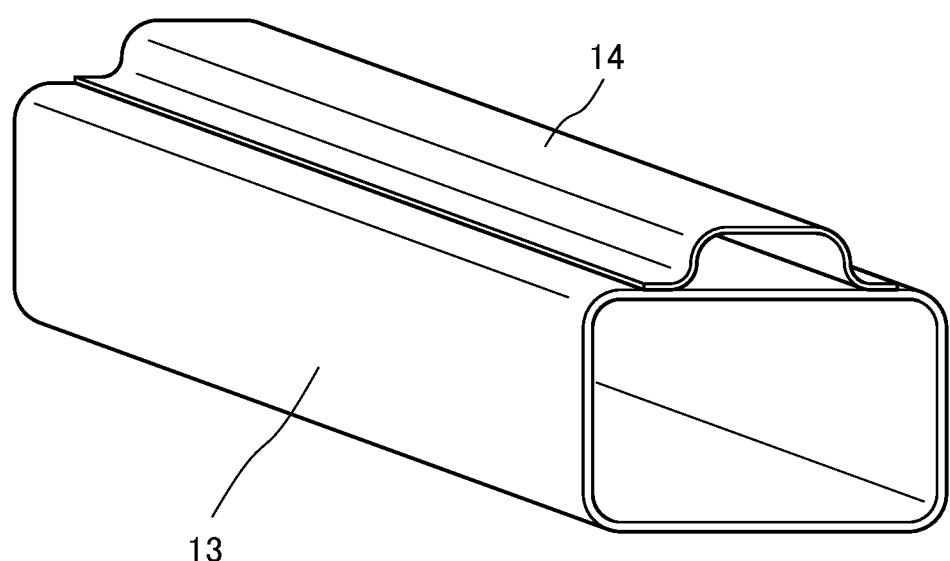
FIG. 7A shows members to be welded by the laser processing system.
Figure 7B:
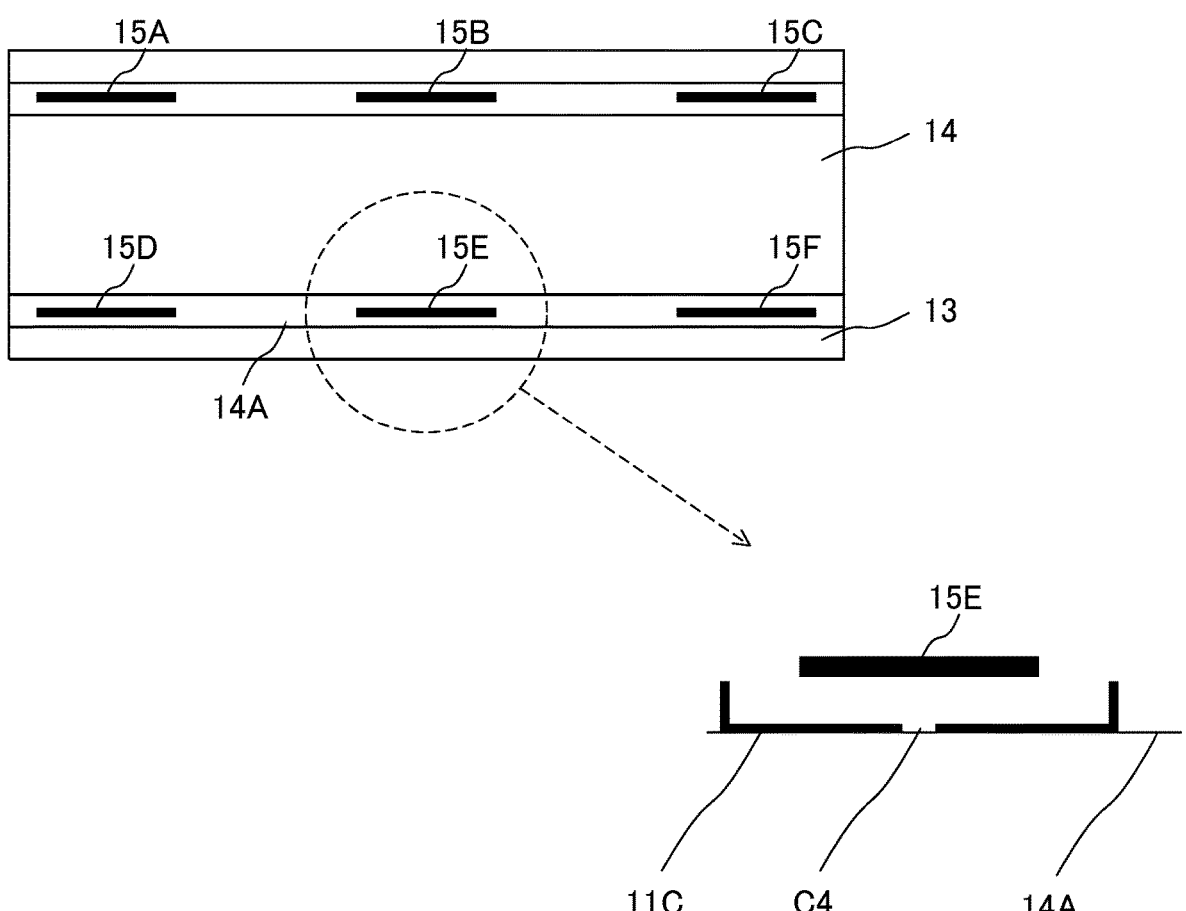
FIG. 7B shows welded parts to be welded by the laser processing system and a control point correction trajectory.

FIGS. 7A and 7B are diagrams for illustrating another example of a control point correction trajectory. FIG. 7A shows members 13 and 14 to be welded by the laser processing system 1. As shown in FIG. 7A, the member 14 is mounted on the tubular member 13, and the laser processing system 1 welds a part of the contact part between the member 13 and the member 14.

FIG. 7B shows welded parts to be welded by the laser processing system 1 and a control point correction trajectory. FIG. 7B is a plan view of the members 13 and 14. As shown in FIG. 7B, the laser processing system 1 welds the members 13 and 14 at welded parts 15A to 15F.

In particular, when the vicinity of the welded part 15E is enlarged, the members 13 and 14 are welded at the welded part 15E in the vicinity of an edge portion 14A of the member 14. The trajectory control unit 61 controls the scanner 4 to illuminate the edge portion 14A of the member 14 with a control point correction trajectory 11C.

The control point correction trajectory 11C has a predetermined length along the edge portion 14A and two L-shapes symmetrical with respect to a control point C4.

The trajectory control unit 61 turns off the guide laser such that only the control point C4 is not emitted so that the operator can clearly visually recognize the control point C4.

When the operator corrects the control point C4, the control point C4 is accurately disposed on the edge portion 14A of the member 14 by moving the straight line part including the control point C4 of the control point correction trajectory 11C onto the edge portion 14A of the member 14.

Further, the operator can accurately adjust the position of the control point C4 and the direction defined by the control point in the coordinate system by adjusting the positions of the short line segments at both ends of the control point correction trajectory 11C. Further, the operator can check and correct the deviation of the laser beam in the optical axis direction from the edge portion 14A of the member 14 with a predetermined length of the control point correction trajectory 11C.

Figure 8A:
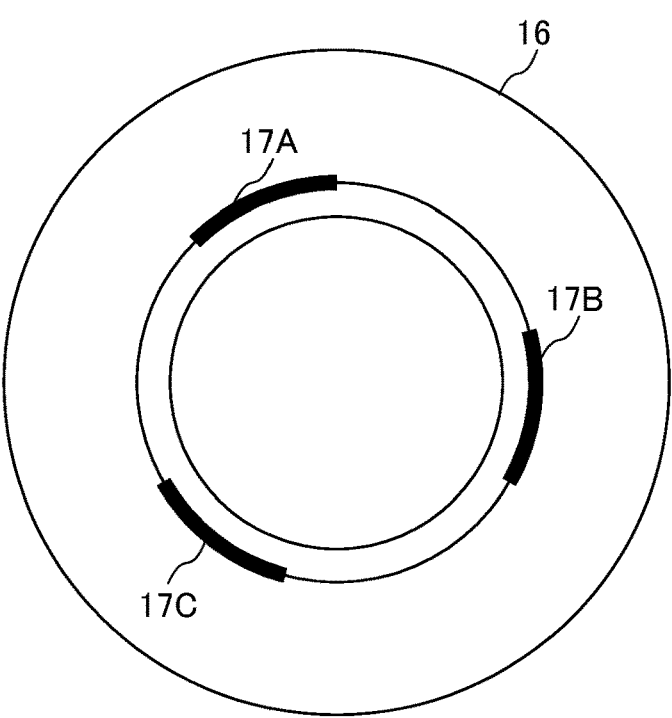
FIG. 8A is a plan view of a member to be welded by the laser processing system.
Figure 8B:
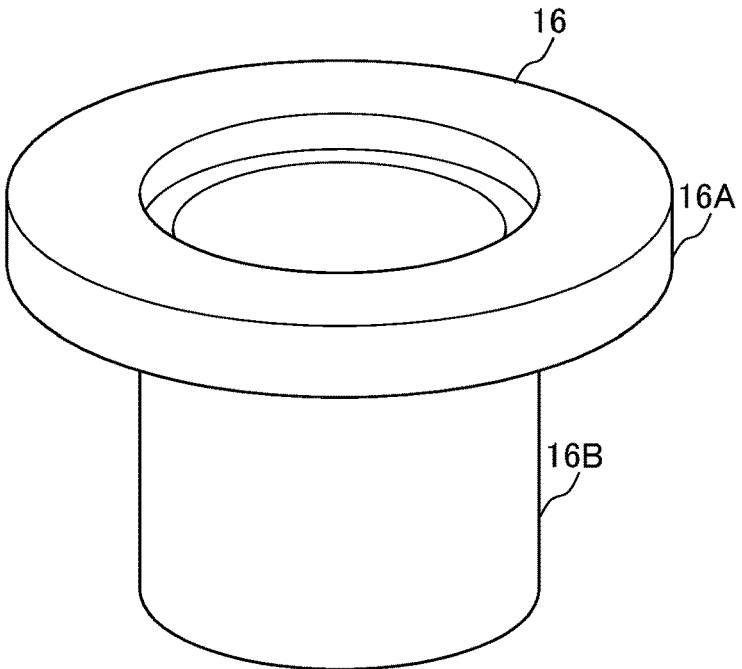
FIG. 8B is a perspective view of the member to be welded by the laser processing system.

FIGS. 8A to 8D are diagrams for illustrating another example of a control point correction trajectory. FIG. 8A is a plan view of the member 16 to be welded by the laser processing system 1, and FIG. 8B is a perspective view of the member 16 to be welded by the laser processing system 1. As shown in FIG. 8A, the member 16 is welded by the laser processing system 1 at welded parts 17A to 17C. As shown in FIG. 8B, the member 16 has a flange part 16A and a pipe part 16B.

Figure 8C:
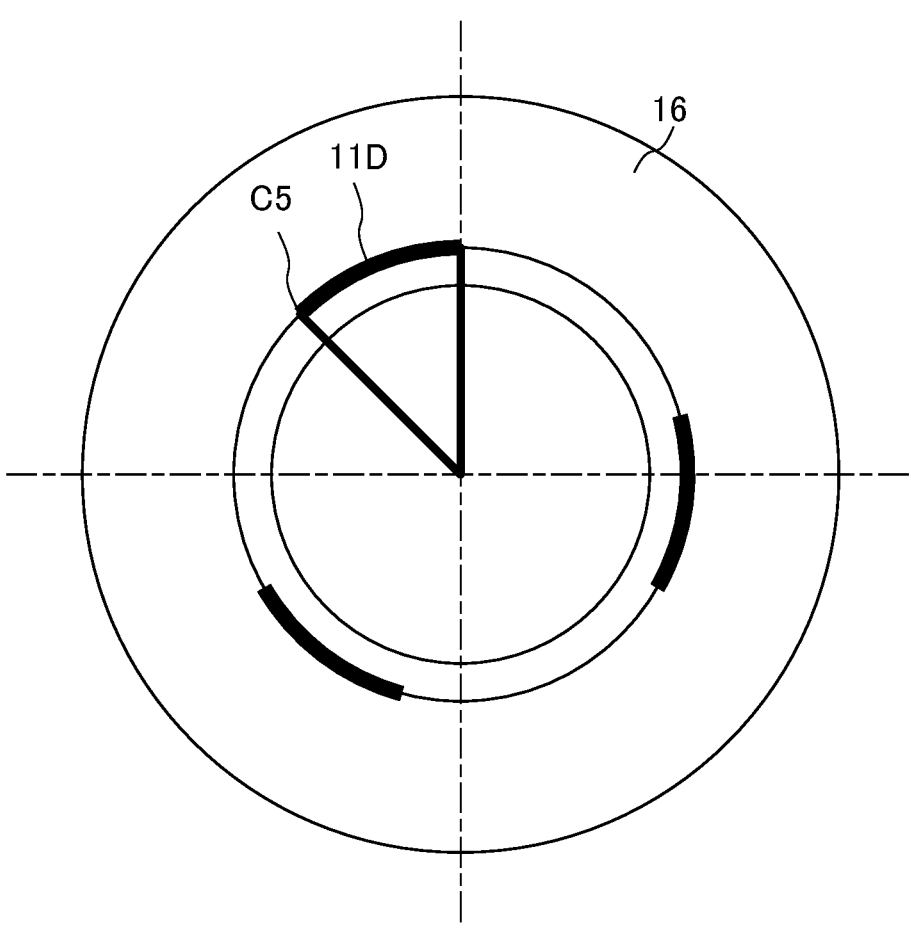
FIG. 8C shows a control point correction trajectory.
Figure 8D:
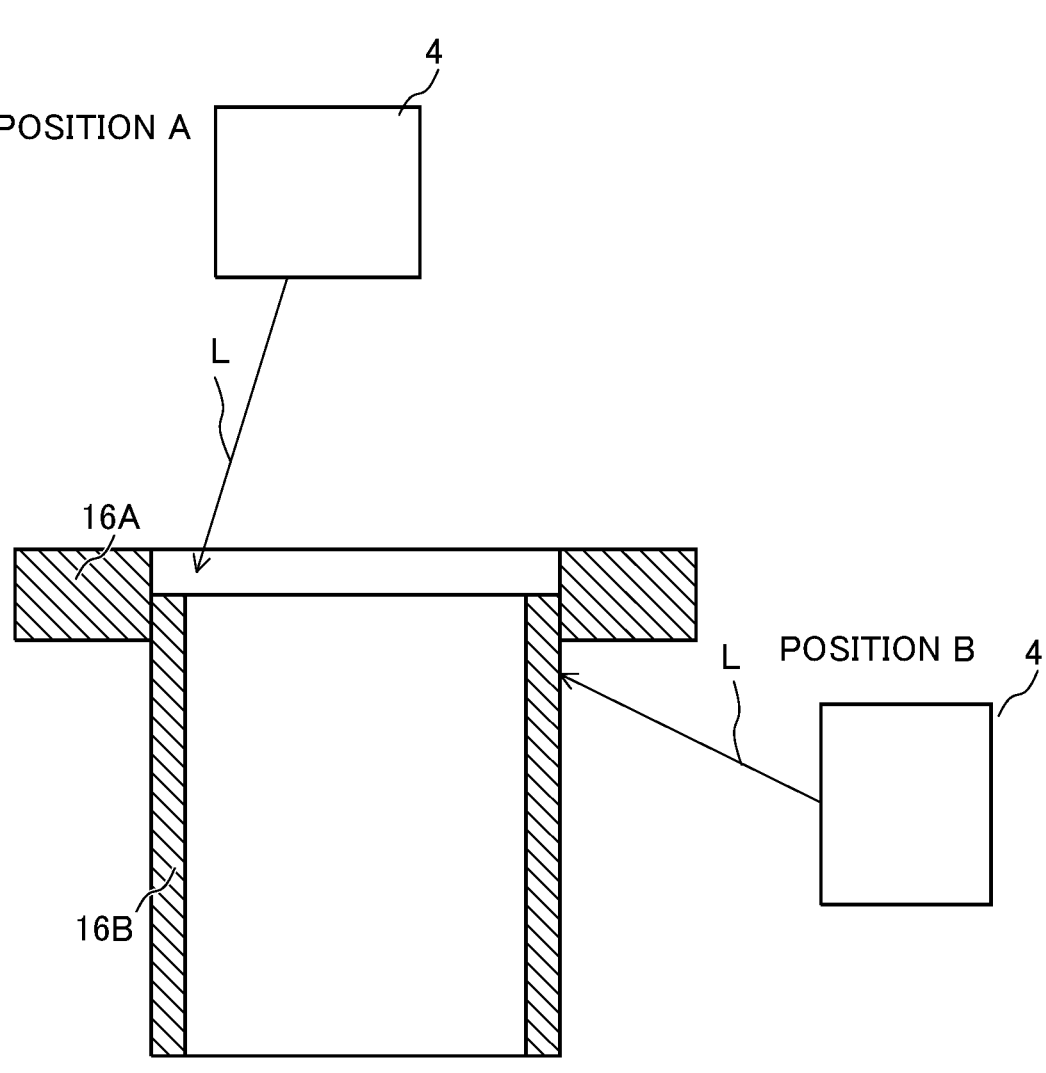
FIG. 8D shows laser beams L respectively emitted from different positions.

FIG. 8C shows a control point correction trajectory 11D. As shown in FIG. 8C, the control point correction trajectory 11D has a sector shape, and a control point C5 is positioned at a part overlapping the welded part 17A on the control point correction trajectory 11D. FIG. 8C shows the control point correction trajectory 11D in the case of welding the welded part 17A. Also, in the case of welding the welded parts 17B and 17C, the control point correction trajectory 11D is similarly emitted to positions corresponding to the welded parts 17B and 17C FIG. 8D shows laser beams L respectively emitted from different positions A and B. As shown in FIG. 8D, at the position A, the scanner 4 welds the flange part 16A and the pipe part 16B from the inner peripheral side of the flange part 16A, and at the position B, the scanner 4 welds the outer periphery of the flange part 16A and the pipe part 16B from the outer peripheral side of the pipe part 16B.

In this case, the control point correction trajectory 11D also moves in the optical axis direction of the laser beam L. When the operator corrects the control point C5, the control point C5 is accurately disposed on the welded parts 17A to 17C by moving the sector shape including the control point C5 of the control point correction trajectory 11D onto the welded parts 17A to 17C.

Figure 9:
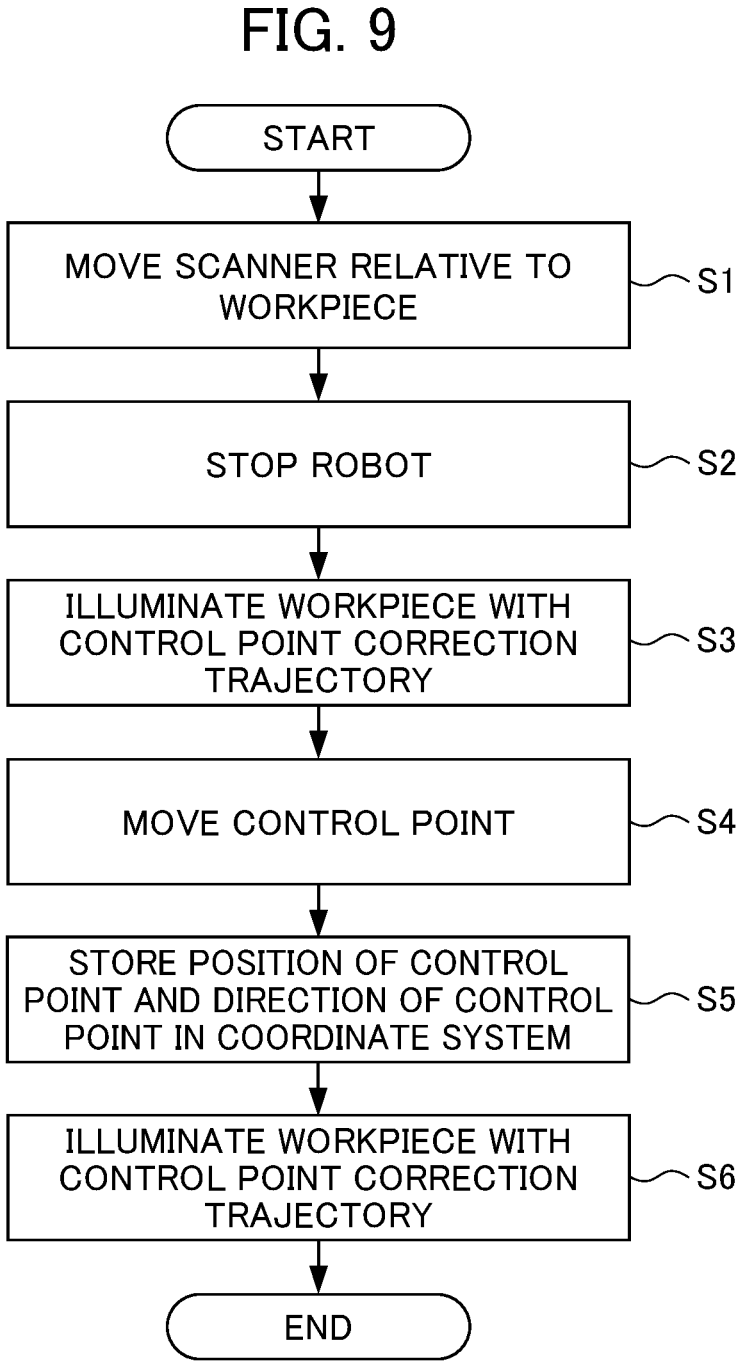
FIG. 9 is a flowchart showing the flow of processing of the laser processing system according to the present embodiment.

FIG. 9 is a flowchart showing the flow of processing of the laser processing system 1 according to the present embodiment. In Step S1, the robot control device 5 controls the robot 2 based on a robot program so as to move the scanner 4 capable of scanning the workpiece 10 with a laser beam, relative to the workpiece 10.

In Step S2, the robot control device 5 controls the robot 2 to stop based on the robot program. In Step S3, the trajectory control unit 61 controls the scanner 4 to illuminate the workpiece 10 with a control point correction trajectory in a state in which the robot 2 is stopped.

In Step S4, the control point moving unit 62 moves a control point based on the control point correction trajectory. In Step S5, the control point storage unit 63 stores the position of the moved control point and the direction defined by the moved control point in a coordinate system.

In Step S6, the trajectory control unit 61 controls the scanner 4 to illuminate the workpiece 10 with the control point correction trajectory based on the position of the moved control point and the direction defined by the moved control point in the coordinate system.

As described above, the laser processing system 1 according to the present embodiment includes the scanner 4 capable of scanning the workpiece 10 with a laser beam, the robot 2 that moves the scanner 4 relative to the workpiece 10, and the scanner control device 6 that controls the scanner 4. The scanner control device 6 includes the trajectory control unit 61 that controls the scanner 4 to illuminate the workpiece 10 with a control point correction trajectory for correcting a preset control point in a state in which the robot 2 is stopped. The control point correction trajectory has a predetermined length for identifying a deviation of the laser beam in the optical axis direction and a predetermined shape for identifying the position of the control point and the direction defined by the control point in the coordinate system.

Thus, the laser processing system 1 can correct the control point using the control point correction trajectory. Therefore, the laser processing system 1 can easily correct the control point only by the operation of the scanner 4 without moving the robot 2.

Further, the laser processing system 1 can correct the control point without using a teaching jig, an additional light source, or a camera and an analysis device for analyzing an image. Further, since the laser processing system 1 simply deflects the optical axis of the guide laser with the scanner 4, the operation of the laser processing system 1 is simple. Further, since the laser processing system 1 uses the guide laser on the same axis as the machining laser, the result of teaching correction is accurate.

Further, the laser processing system 1 can accurately adjust the position of the laser beam in the optical axis direction, the position of the plane perpendicular to the optical axis, the position of the control point and the direction defined by the control point in the coordinate system, the inclination of the workpiece 10, and the like by using the control point correction trajectory. Particularly, in laser welding, since a laser is often applied along a linear shape such as a butt or edge, the direction and position of the laser beam can be appropriately adjusted by using the laser processing system 1 according to the present embodiment.

The trajectory control unit 61 controls the scanner 4 to repeatedly scan the control point correction trajectory at a predetermined cycle. Thus, the afterimage effect allows the operator to perceive the control point correction trajectory as if it were continuously drawn. Accordingly, the operator can check and correct the position, direction, size, and distortion of the control point correction trajectory by perceiving the control point correction trajectory.

The control point correction trajectory illuminated on workpiece 10 has the same length and shape as the control point correction trajectory in the scanner program for controlling the scanner 4, and can be compared with the correction pattern 12 that can be disposed on the workpiece 10. Thus, the operator compares the control point correction trajectory illuminated on the workpiece 10 with the control point correction trajectory in the scanner program, and thereby can check and correct the position, direction, size, and distortion of the control point correction trajectory.

The scanner control device 6 further includes the control point moving unit 62 that moves the control point based on the control point correction trajectory, and the control point storage unit 63 that stores the position of the moved control point and the direction defined by the moved control point in the coordinate system. The trajectory control unit 61 controls the scanner 4 to illuminate the workpiece 10 with the control point correction trajectory based on the position of the control point and the direction defined by the control point in the coordinate system.

Thus, the laser processing system 1 can correct the position of the control point and the direction defined by the control point in the coordinate system within the scanning range of the scanner 4 without moving the robot 2. Therefore, the laser processing system 1 can correct the control point by only scanning with a guide laser without changing the posture of the robot 2.

The predetermined length for identifying a deviation of the laser beam in the optical axis direction is calculated from the distance at which the change of the length of the control point correction trajectory can be visually recognized, the amount of deviation of the laser beam in the optical axis direction to be identified, and the distance between the scanner 4 and the laser irradiation point of the laser beam. Thereby, the laser processing system 1 can appropriately identify a deviation of the laser beam in the optical axis direction.

The embodiments of the present invention have been described above, but the laser processing system 1 can be implemented by hardware, software, or a combination thereof. The control method performed by the laser processing system 1 can also be implemented by hardware, software, or a combination thereof. Here, "implemented by software" means that it is implemented by a computer reading and executing a program.

The program may be stored in various types of non-transitory computer readable media to be provided to the computer. The non-transitory computer readable media include various types of tangible storage media. Examples of the non-transitory computer readable media include magnetic recording media (e.g., hard disk drives), magneto-optical recording media (e.g., magneto-optical disks), CD-ROMs (read only memories), CD-Rs, CD-R/Ws, and semiconductor memories (e.g., mask ROMs, PROMs (programmable ROMs), EPROMs (erasable PROMs), flash ROMs, and RAMS (random access memories)).

Although the above-described embodiments are preferred embodiments of the present invention, the scope of the present invention is not limited to the above-described embodiments. Various modifications can be made without departing from the gist of the present invention.

EXPLANATION OF REFERENCE NUMERALS 1 laser processing system
2 robot
3 laser oscillator
4 scanner
5 robot control device
6 scanner control device
7 laser control device
8 robot teaching operation panel
9 program generation device
10 workpiece
61 trajectory control unit
62 control point moving unit
63 control point storage unit

The invention claimed is:
1. A laser processing system, comprising:
   a scanner capable of scanning a workpiece with a laser beam;

a moving device configured to move the scanner relative to the workpiece; and a scanner control device configured to control the scanner, wherein the scanner control device comprises a trajectory control unit configured to control the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the control point correction trajectory illuminated on the workpiece has the same length and shape as a control point correction trajectory in a scanner program for controlling the scanner, and can be compared with a correction pattern that can be disposed on the workpiece.

2. The laser processing system according to claim 1, wherein the trajectory control unit controls the scanner to repeatedly scan the control point correction trajectory at a predetermined cycle.

3. A laser processing system, comprising:

a scanner capable of scanning a workpiece with a laser beam;

a moving device configured to move the scanner relative to the workpiece; and a scanner control device configured to control the scanner, wherein the scanner control device comprises a trajectory control unit configured to control the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the scanner control device further comprises:

a control point moving unit configured to move the control point based on the control point correction trajectory; and a control point storage unit configured to store a position of the moved control point and a direction defined by the moved control point in a coordinate system, and wherein the trajectory control unit controls the scanner to illuminate the workpiece with the control point correction trajectory based on the position of the moved control point and the direction defined by the moved control point in the coordinate system.

4. A laser processing system, comprising:

a scanner capable of scanning a workpiece with a laser beam;

a moving device configured to move the scanner relative to the workpiece; and a scanner control device configured to control the scanner, wherein the scanner control device comprises a trajectory control unit configured to control the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the predetermined length for identifying the deviation of the laser beam in the optical axis direction is calculated from a distance at which a change of a length of the control point correction trajectory can be visually recognized, an amount of the deviation of the laser beam in the optical axis direction, and a distance between the scanner and a laser irradiation point of the laser beam.

5. A method for controlling a laser processing system, the method comprising:

moving a scanner capable of scanning a workpiece with a laser beam, relative to the workpiece;

stopping a moving device configured to move the scanner relative to the workpiece; and controlling the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the control point correction trajectory illuminated on the workpiece has the same length and shape as a control point correction trajectory in a scanner program for controlling the scanner, and can be compared with a correction pattern that can be disposed on the workpiece.

6. A method for controlling a laser processing system, the method comprising:

moving a scanner capable of scanning a workpiece with a laser beam, relative to the workpiece;

stopping a moving device configured to move the scanner relative to the workpiece; and controlling the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the scanner control device further comprises:

a control point moving unit configured to move the control point based on the control point correction trajectory; and a control point storage unit configured to store a position of the moved control point and a direction defined by the moved control point in a coordinate system, and wherein the trajectory control unit controls the scanner to illuminate the workpiece with the control point correction trajectory based on the position of the moved control point and the direction defined by the moved control point in the coordinate system.

7. A method for controlling a laser processing system, the method comprising:

moving a scanner capable of scanning a workpiece with a laser beam, relative to the workpiece;

stopping a moving device configured to move the scanner relative to the workpiece; and controlling the scanner to illuminate the workpiece with a control point correction trajectory for correcting a preset control point in a state in which the moving device is stopped, wherein the control point correction trajectory has a predetermined length for identifying a deviation of the laser beam in an optical axis direction and a predetermined shape for identifying a position of the control point and a direction defined by the control point in a coordinate system, and wherein the predetermined length for identifying the deviation of the laser beam in the optical axis direction is calculated from a distance at which a change of a length of the control point correction trajectory can be visually recognized, an amount of the deviation of the laser beam in the optical axis direction, and a distance between the scanner and a laser irradiation point of the laser beam.

* * * * *